US012697590B2

(12) United States Patent
Loercher et al.

(10) Patent No.: US 12,697,590 B2
(45) Date of Patent: Aug. 4, 2026

(54) DIFFUSION DEVICE

(71) Applicant: GAMBRO LUNDIA AB, Lund (SE)

(72) Inventors: Joachim Loercher, Moessingen (DE);
Ralf Flieg, Rangendingen (DE);
Torsten Knoer, Burladingen (DE);
Steffen Wagner, Meßstetten (DE);
Christof Beck, Bitz (DE); Markus Loeffler, Hechingen (DE)

(73) Assignee: GAMBRO LUNDIA AB, Lund (SE)

( * ) Notice: Subject to any disclaimer, the term of this patent is extended or adjusted under 35 U.S.C. 154(b) by 544 days.

(21) Appl. No.: 18/001,967

(22) PCT Filed: Jun. 17, 2021

(86) PCT No.: PCT/EP2021/066332
§ 371 (c)(1),
(2) Date: Dec. 15, 2022

(87) PCT Pub. No.: WO2021/255135
PCT Pub. Date: Dec. 23, 2021

(65) Prior Publication Data
US 2023/0226495 A1        Jul. 20, 2023

(51) Int. Cl.
B01D 63/02        (2006.01)

(52) U.S. Cl.
CPC .... *B01D 63/0232* (2022.08); *B01D 2313/042* (2022.08)

(58) Field of Classification Search
CPC .......... B01D 63/0232; B01D 2313/042; B01D 2315/22
See application file for complete search history.

(56) References Cited

U.S. PATENT DOCUMENTS

| | | | |
|---|---|---|---|
| 2005/0194305 A1 | 9/2005 | Vido et al. | |
| 2014/0263061 A1 | 9/2014 | Taylor et al. | |
| 2015/0165106 A1 | 6/2015 | Buck et al. | |

FOREIGN PATENT DOCUMENTS

| | | |
|---|---|---|
| JP | 02119923 | 5/1990 |

OTHER PUBLICATIONS

PCT Search Report and Written Opinion prepared for PCT Application No. PCT/EP2021/066332, completed Aug. 31, 2021.

*Primary Examiner* — Hayden Brewster
(74) *Attorney, Agent, or Firm* — Barnes & Thornburg LLP

(57) ABSTRACT

The present disclosure relates to a diffusion device, such as a blood oxygenator or gas exchanger, and a process for its production. The diffusion device is used in the removal of carbon dioxide from blood.

7 Claims, 3 Drawing Sheets

2/3

DIFFUSION DEVICE

CROSS-REFERENCE TO RELATED APPLICATIONS

This application is a national stage entry under 35 U.S.C. § 371(b) of PCT International Application No. PCT/EP2021/066332, filed Jun. 17, 2021, which claims the benefit of European Patent Application Serial No. 20180929.0, filed on Jun. 18, 2020, the entire disclosures of both of which are incorporated herein by reference.

TECHNICAL FIELD

The present disclosure relates to a diffusion device, such as a blood oxygenator or gas exchanger, and a process for its production. The diffusion device is used in the removal of carbon dioxide from blood.

DESCRIPTION OF THE RELATED ART

Diffusion devices used as blood oxygenators or gas exchangers are known, for instance, from DE 10 2010 027 973 A1, US 2015/10434 A1, EP 0 621 047 B1, EP 1 108 462 A2, or CA 2 071 850 A1. These devices generally encompass a tubular casing with a plurality of hollow fiber membranes arranged in the casing in a way that a seal is provided between the first flow space formed by the fiber cavities and a second flow space surrounding the membranes on the outside. The semi-permeable hollow fiber membranes are gas exchange membranes, i.e., they are permeable to gases like oxygen and carbon dioxide, but impermeable to liquids. In most devices, the semi-permeable hollow fiber membranes are arranged in the form of hollow fiber mats wound on a cylindrical core, so that the innermost membrane layer directly contacts the core. The flow space formed by the lumen of the hollow fibers is separated from the flow space on the outside of the hollow fibers by end walls formed by potting the fiber ends with a potting material, e.g., a polyurethane resin. After the potting material has hardened, the ends of the hollow fibers are cut off to re-open the lumen of the hollow fibers.

The surface of the cylindrical core does not provide form closure with the potting material; and the membrane mat directly contacting the core prevents adhesion between the potting material and the core. This reduces the ability of the potting material to withstand mechanical stress generated, for instance, by membrane shrinkage or thermal expansion at elevated temperatures. As a result, delamination of the end walls from the core and formation of leaks may occur.

It is an object of the present invention to provide a diffusion device which is more resilient against delamination of the end walls from the core.

SUMMARY

The present disclosure provides a diffusion device, e.g., a blood oxygenator or a gas exchanger. The device comprises a tubular housing, a plurality of semi-permeable hollow fiber membranes arranged within the housing, and end caps sealing the mouths of the housing. The semi-permeable hollow fiber membranes are arranged in the form of hollow fiber mats wound around a cylindrical core. The flow space formed by the lumen of the hollow fiber membranes is separated from the flow space on the outside of the hollow fiber membranes by end walls comprised of a polyurethane resin. According to the present disclosure, the cylindrical core of the diffusion device has features which improve the adhesion of the end walls to the core.

The present disclosure also provides a process for manufacturing the diffusion device. The process involves providing a cylindrical core; wrapping mats comprising hollow fiber membranes around the core; transferring the wrapped core into a tubular housing; and potting the ends of the semi-permeable hollow fiber membranes with polyurethane to form end walls separating a flow space formed by the lumen of the hollow fibers from a flow space on the outside of the hollow fibers. According to the present disclosure, a core is used which has features which improve the adhesion of the end walls to the core.

DETAILED DESCRIPTION

Figure 1:
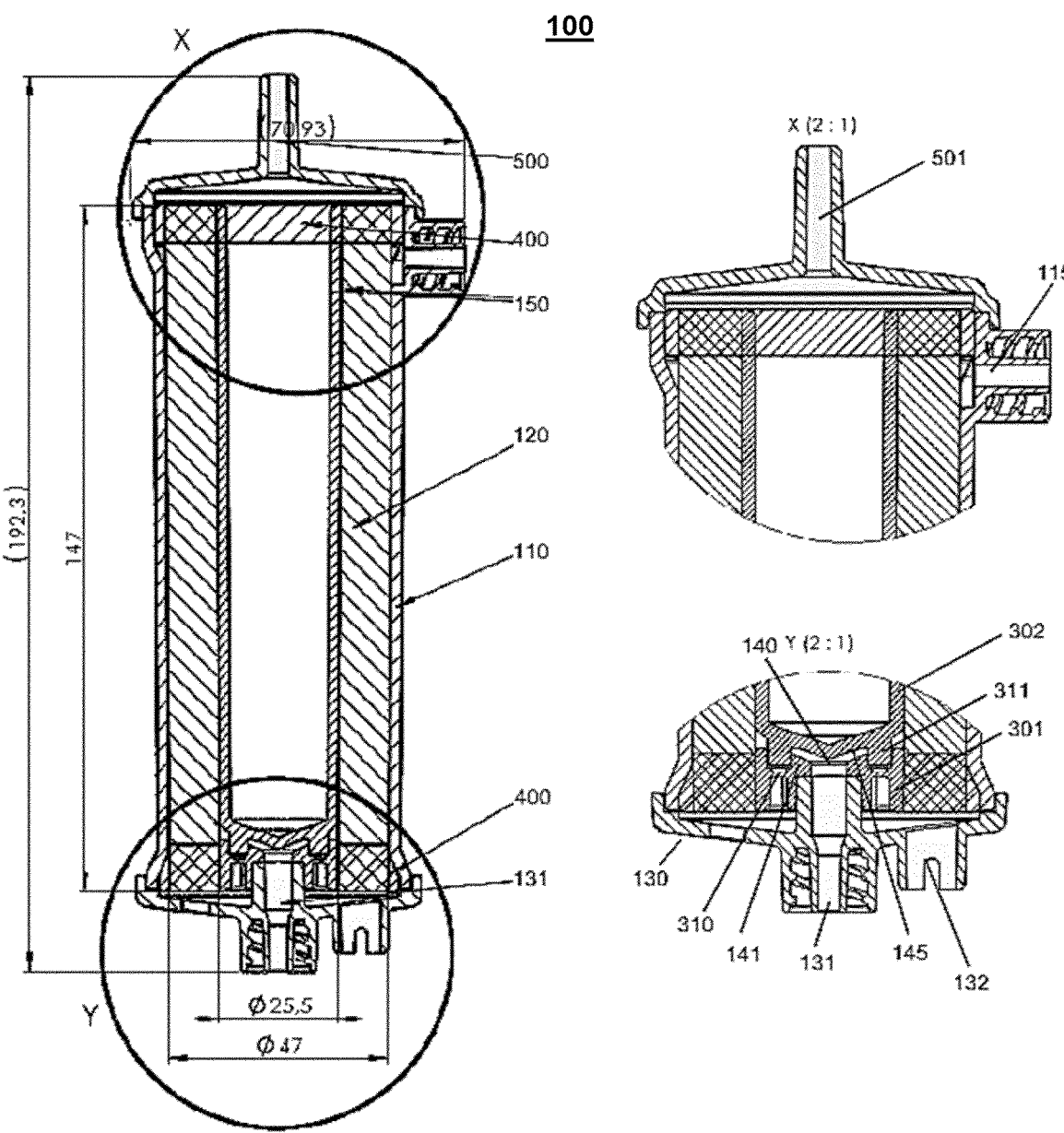
FIG. 1 shows a cross-sectional view and two partial cross-sectional views of a prior art diffusion device.

The present disclosure provides a diffusion device. In one embodiment, the diffusion device is a blood oxygenator. In a particular embodiment, the blood oxygenator is designed for extracorporeal membrane oxygenation (ECMO). In another embodiment, the diffusion device is a gas exchanger. In a particular embodiment, the gas exchanger is designed for the removal of carbon dioxide from blood in an extracorporeal circuit (ECCO2R).

The device comprises a tubular housing, a plurality of semi-permeable hollow fiber membranes arranged within the housing, and end caps sealing the mouths of the housing. The semi-permeable hollow fiber membranes are arranged in the form of hollow fiber mats wound on a cylindrical core. The flow space formed by the lumen of the hollow fiber membranes is separated from the flow space on the outside of the hollow fiber membranes by end walls comprised of a polyurethane resin. The end walls are formed by potting the fiber ends with a polyurethane resin and cutting off the ends of the fibers to re-open the lumen of the fibers after the resin has hardened.

In the context of the present disclosure, the term "cylindrical core" is not meant to be limited to strictly cylindrical parts, but also includes slightly conical cores having an angle of aperture of not more than 5°, e.g., not more than 3°.

According to the present disclosure, the cylindrical core of the diffusion device has features which improve the adhesion of the end walls to the core. In one embodiment of the device, the outer surface of the core is coated with a polyurethane resin. In a particular embodiment, the polyurethane coating only is present in sections of the core which contact the end walls. In another particular embodiment, the outer surface of the cylindrical core is completely coated with polyurethane.

In a further embodiment, the outer surface of the core features at least one circumferential notch in a section of the core where an end wall contacts the core. In a further embodiment, the outer surface of the core features at least one circumferential notch in each section of the core where an end wall contacts the core. In a further embodiment, the outer surface of the core features at least two circumferential notches in each section of the core where an end wall contacts the core. The at least one circumferential notch creates a space between the outer surface of the core and the innermost membrane layer. The space is filled by polyurethane during the potting process, creating a form closure between potting and core.

In another further embodiment, a plurality of elongated noses which are parallel to the longitudinal axis of the core are located on the outer surface of the core in a section of the core where an end wall contacts the core. In a further embodiment, the outer surface of the core features a plurality of elongated noses in each section of the core where an end wall contacts the core. In one embodiment, the noses are evenly distributed over the circumference of the core. In one embodiment, the number of noses is in the range of from 3 to 16, for instance, from 4 to 8. In one embodiment, the length of the noses in longitudinal direction is less than the thickness or the end wall. In another embodiment, the length of the noses in longitudinal direction is greater than or equal to the thickness of the end wall. In one embodiment, the cross-section of the noses is dovetail-shaped. In another embodiment, the cross-section of the noses is mushroom-shaped. In a further embodiment, at least one circumferential ridge provided on the outer surface of the core connects the noses. In a further embodiment, at least two circumferential ridges provided on the outer surface of the core connect the noses. In one embodiment, the width of the at least one circumferential ridge is in the range of from 0.5 mm to 2.0 mm. The noses and the circumferential ridges, respectively, act as spacers between the membranes and the outer surface of the core. The empty space becomes filled with polyurethane during the potting process, creating a form closure between potting and core and providing anchors to the end walls. Radial displacement of an end wall is suppressed by the noses, while axial displacement of an end wall is suppressed by the circumferential ridges.

The diffusion device of the present disclosure comprises a tubular housing. In one embodiment, the tubular housing provides an outlet for blood arranged on the outer wall of the housing. In a further embodiment, the blood outlet is located near an end of the tubular housing opposite to a first end cap. In one embodiment, the tubular housing is comprised of polycarbonate.

A plurality of semi-permeable hollow fiber membranes is disposed inside the housing between the outer surface of the core and the inner wall of the housing. In one embodiment, the semi-permeable hollow fiber membranes are gas exchange membranes, i.e., they are permeable to gases like oxygen and carbon dioxide, but impermeable to liquids.

The semi-permeable hollow fiber membranes are arranged in the form of hollow fiber mats wound on a cylindrical core. The hollow fiber mats form a cylindrical shell that contacts the inner surface of the tubular housing. The ends of the hollow fibers are open, so that a gas flow can be conducted through the lumen of the hollow fibers, i.e., from one mouth of the housing to the mouth opposite to it. During operation of the diffusion device, blood flows on the outside of the hollow fibers, and gas can permeate through the wall of the hollow fibers in both directions. The flow space formed by the lumen of the hollow fibers is separated from the flow space on the outside of the hollow fibers by end walls. The end walls are formed by potting the fiber ends with a polyurethane resin. After the resin has hardened, the ends of the hollow fibers are cut off to re-open the lumen of the hollow fibers.

The diffusion device comprises a first end cap sealing a first mouth of the housing. The end cap comprises an inlet for the introduction of blood into the housing, arranged axially in the center of the first end cap. In one embodiment, a two-start thread which fits a standard blood-line connector is provided round the inlet. The inner surface of the end cap is rotationally symmetrical about the longitudinal axis of the inlet. The inlet is also coaxial to the longitudinal axis of the housing. In a further embodiment, the end cap also comprises an outlet for evacuating a gas from the diffusion device, e.g., a gas mixture comprising carbon dioxide.

An embodiment of the diffusion device of the present disclosure additionally comprises a second end cap sealing a second mouth of the housing, i.e. the mouth opposite the mouth with the first end cap. The second end cap provides an inlet for introducing a gas, e.g., air or oxygen, into the diffusion device.

In one embodiment, the housing and end caps of the device of the present disclosure are made of a transparent polymer, e.g., a polyolefin such as polyethylene or polypropylene; a polyester such as PET, PBT, or polycarbonate; a polystyrene (HIPS); or a polymethyl(meth)acrylate. In one embodiment, the housing and end caps are made of polycarbonate, and the potting material forming the end walls is comprised of polyurethane. In one embodiment, the cylindrical core is comprised of a thermoplastic polymer. In a particular embodiment, the cylindrical core is comprised of polycarbonate. In one embodiment, the cylindrical core is manufactured by injection molding.

The present disclosure also provides a process for manufacturing the diffusion device. The process involves providing a cylindrical core; wrapping mats comprising hollow fiber membranes around the core; transferring the wrapped core into a tubular housing; and potting the ends of the semi-permeable hollow fiber membranes with polyurethane to form end walls separating a flow space formed by the lumen of the hollow fibers from a flow space on the outside of the hollow fibers. According to the present disclosure, a core is used which has features which improve the adhesion of the end walls to the core.

In one embodiment, the outer surface of the cylindrical core is coated with a polyurethane resin prior to wrapping the hollow fiber membrane mats around it. In a particular embodiment, the polyurethane coating only is present in sections of the core which contact the end walls. In another particular embodiment, the outer surface of the cylindrical core is completely coated with polyurethane.

In a further embodiment, the cylindrical core features circumferential notches in sections of the cylindrical core where the end walls contact the cylindrical core.

In a further embodiment, a plurality of elongated noses which are parallel to the longitudinal axis of the cylindrical core are located in sections of the cylindrical core where the end walls contact the cylindrical core. In one embodiment, the cross-section of the noses is dovetail-shaped. In another embodiment, the cross-section of the noses is mushroom-shaped. In a further embodiment, the outer surface of the core features circumferential ridges which connect the noses.

After the end walls have been formed in the potting step, the ends of the hollow fiber membranes are cut off with a transversal cut to re-open the lumen of the hollow fiber membranes. End caps are subsequently mounted on both ends of the tubular housing to close the mouths of the housing; and the end caps are welded or glued to the housing to seal the diffusion device.

The diffusion device of the present disclosure will now be described in more detail referring to the accompanying drawings. It is to be understood that the drawings are not intended to limit the scope of the present disclosure and are merely an illustration of preferred embodiments of the device.

FIG. 1 shows a cross-sectional view of a prior art diffusion device 100. Enlarged detail views X and Y of the device are also shown. The mouths of tubular housing 110 are covered by a first end cap 130 and a second end cap 500, respectively. The housing 110 has a blood inlet 115 positioned on the outer wall of the hosing adjacent to the second end cap 500. The first end cap 130 features a blood inlet 131 and a gas outlet 132, the second end cap 500 features a gas inlet 501. Hollow fibers 120 are arranged within the housing 110 around a cylindrical core 150. End walls 400 separate a first flow space formed by the lumen of the hollow fibers 120 and cavities defined by the second end cap 500 and the first end cap 130 from a second flow space defined by blood inlet 131, blood duct 140, and the space outside the hollow fibers 120 and between the inner wall surface of the housing 110 and the outer wall surface of the core 150. The core 150 is formed by an assembly of two component parts 301 and 302. Component part 301 features four depressions 310, component part 302 has four corresponding protrusions 311. The protrusions 311 enter the depressions 310 upon assembly of the core and together form blood duct 140, component part 301 defining a first surface 141; and component part 302 defining a second surface 145 of the blood duct 140.

Figure 2:
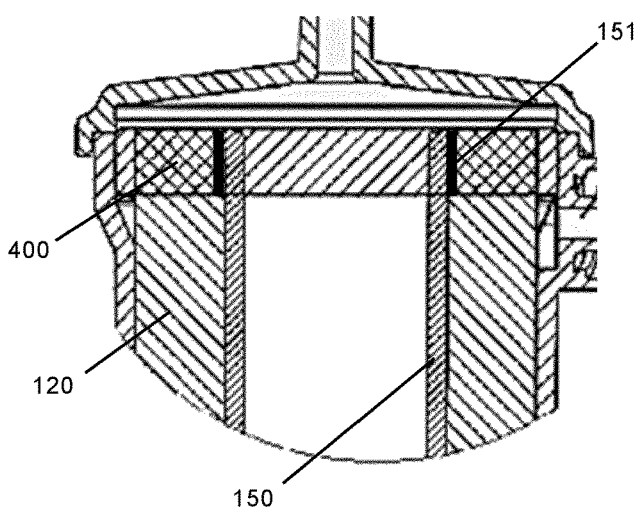
FIG. 2 shows a schematic partial cross-sectional view of an embodiment of the diffusion device of the present disclosure.

FIG. 2 shows a schematic partial cross-sectional view of an embodiment of the diffusion device of the present disclosure. A header section of the device with an end wall 400 is shown. At the interface of the end wall 400 and the cylindrical core 150, a layer 151 of polyurethane is disposed. The polyurethane layer 151 improves the adhesion of the end wall 400 with the embedded ends of the hollow fibers 120 to the cylindrical core 150.

Figure 3:
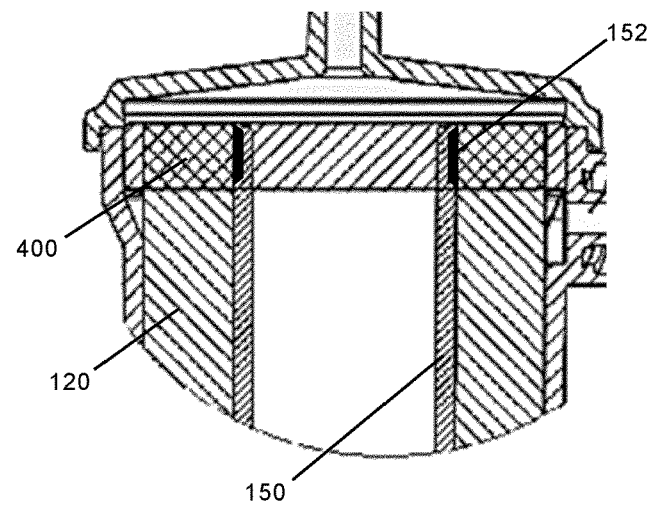
FIG. 3 shows a schematic partial cross-sectional view of another embodiment of the diffusion device of the present disclosure.

FIG. 3 shows a schematic partial cross-sectional view of another embodiment of the of the diffusion device of the present disclosure. A header section of the device with an end wall 400 is shown. In the section of the cylindrical core 150 contacting the end wall 400, the cylindrical core 150 features a circumferential notch 152. The circumferential notch 152 is filled with polyurethane during the potting process of the hollow fiber membranes 120 and the formation of the end wall 400. The polyurethane-filled circumferential notch 152 improves the adhesion of the end wall 400 to the cylindrical core 150.

Figure 4:
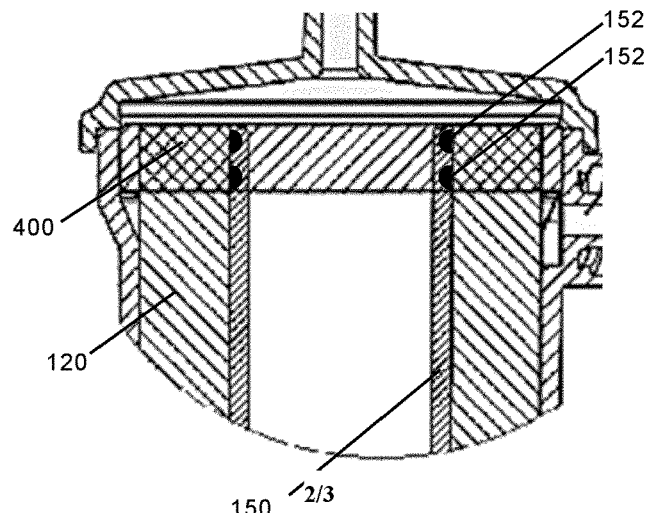
FIG. 4 shows a schematic partial cross-sectional view of yet another embodiment of the diffusion device of the present disclosure.

FIG. 4 shows a schematic partial cross-sectional view of yet another embodiment of the of the diffusion device of the present disclosure. In contrast to the embodiment shown if FIG. 3, two circumferential notches 152 are provided in the section of the cylindrical core 150 contacting the end wall 400.

Figure 5:
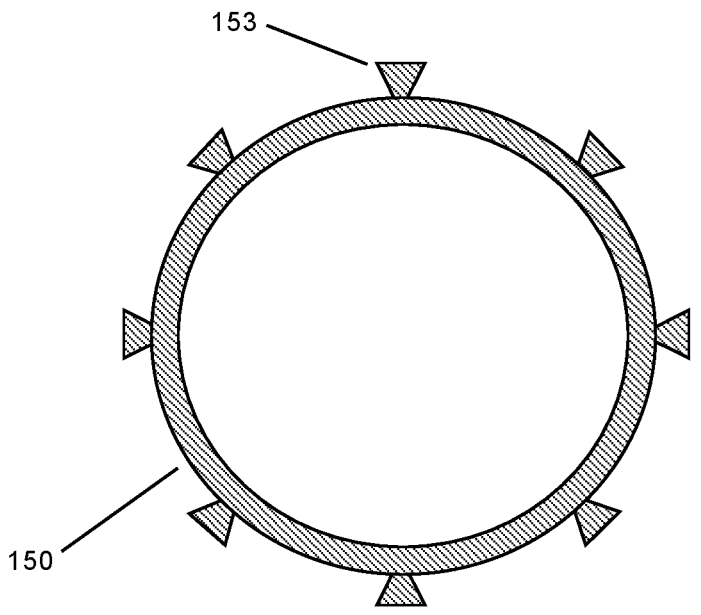
FIG. 5 shows a schematic top view of an embodiment of the cylindrical core of the diffusion device of the present disclosure.

FIG. 5 shows a schematic top view of an embodiment of the cylindrical core 150 of the diffusion device of the present disclosure. The cylindrical core 150 features a plurality of dovetail-shaped noses 153 in the sections of the cylindrical core 150 contacting the end walls. In the embodiment shown in FIG. 5, eight dovetail-shaped noses 153 are evenly distributed over the circumference of the cylindrical core 150.

Figure 6:
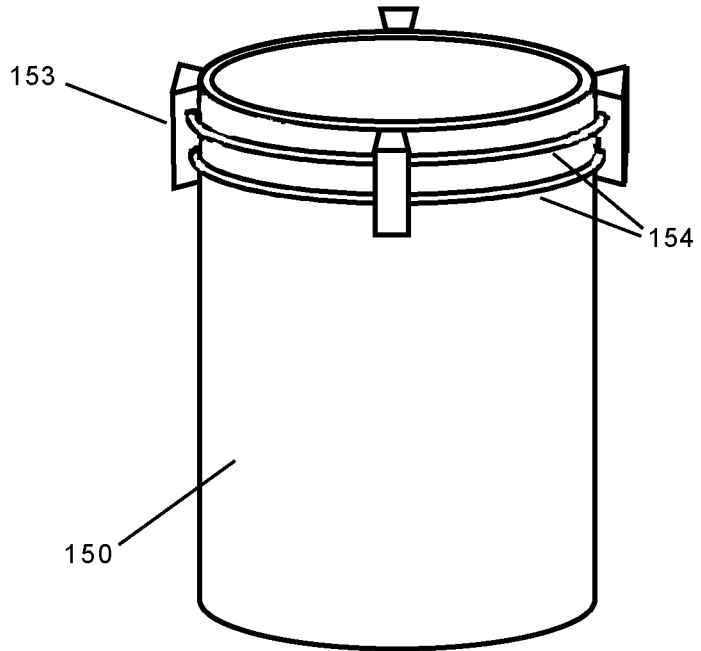
FIG. 6 shows a schematic partial perspective view of another embodiment of the cylindrical core of the diffusion device of the present disclosure.

FIG. 6 shows a schematic partial perspective view of another embodiment of the cylindrical core of the diffusion device of the present disclosure. Only one of the two header sections of the cylindrical core 150 is shown. As in the embodiment shown in FIG. 5, the cylindrical core 150 features a plurality of dovetail-shaped noses 153 in the sections of the cylindrical core 150 contacting the end walls. In the embodiment shown in FIG. 6, four dovetail-shaped noses 153 are evenly distributed over the circumference of the cylindrical core 150. Additionally, two circumferential ridges 154 are provided in the sections or the cylindrical core 150 contacting the end walls. The circumferential ridges 154 act as anchors for the end wall, preventing axial displacement of the end wall.

LIST OF REFERENCE SIGNS 100 diffusion device
110 tubular housing
115 blood outlet
120 hollow fiber membranes
130 first end cap
131 blood inlet
132 air outlet
140 blood duct
141 first inner surface
145 second inner surface
150 cylindrical core
151 polyurethane layer
152 circumferential notch
153 nose
154 circumferential ridge
301 first component part
302 second component part
310 depression
311 protrusion
400 end wall
500 second end cap
501 air inlet

The invention claimed is:

1. A diffusion device comprising
a tubular housing;
a plurality of semi-permeable hollow fiber membranes arranged within the housing on a cylindrical core, the cylindrical core extending along a longitudinal axis of the tubular housing;
end walls comprised of a polyurethane resin separating a flow space formed by a plurality of lumens of the hollow fiber membranes from a flow space on the outside of the hollow fiber membranes, the end walls adhering to an inner wall of the tubular housing; and
end caps sealing a first mouth and a second mouth of the housing,
characterized in that the cylindrical core has features which improve the adhesion of the end walls to the cylindrical core, namely, that the outer surface of the cylindrical core features a plurality of elongated noses which are parallel to the longitudinal axis of the cylindrical core and are located on the outer surface of the cylindrical core in a section of the cylindrical core where the end wall contacts the cylindrical core,
wherein at least one circumferential ridge connecting the elongated noses is provided on the outer surface of the cylindrical core.

2. The diffusion device of claim 1, wherein the noses are evenly distributed over the circumference of the cylindrical core and the length of the noses in longitudinal direction is less than the thickness of the end wall.

3. The diffusion device of claim 1, wherein the cross-section of the noses is dovetail-shaped.

4. The diffusion device of claim 1, wherein at least two circumferential ridges connecting the noses are provided on the outer surface of the cylindrical core.

5. The diffusion device of claim 2, wherein the cross-section of the noses is dovetail-shaped.

6. The diffusion device claim 2, wherein at least one circumferential ridge connecting the noses is provided on the outer surface of the cylindrical core.

7. The diffusion device claim 3, wherein at least one circumferential ridge connecting the noses is provided on the outer surface of the cylindrical core.

* * * * *